Figure 1:
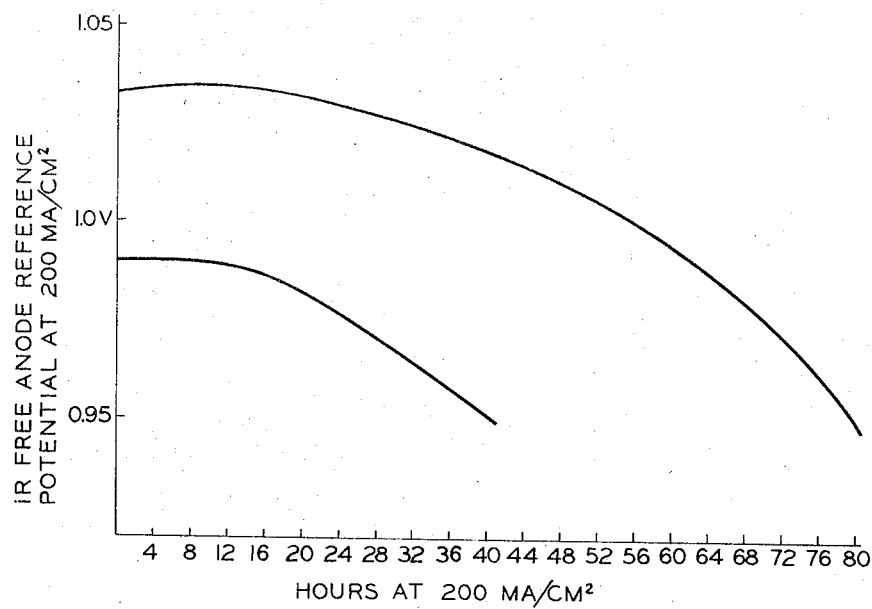

United States Patent [19]

Meibuhr et al.

[11] 3,852,116

[45] Dec. 3, 1974

[54] STABILIZATION OF NICKEL BORIDE CATALYST IN POTASSIUM HYDROXIDE ELECTROLYTES

[75] Inventors: Stuart G. Meibuhr, Birmingham; Edward J. Zeitner, Jr., Sterling Heights, both of Mich.

[73] Assignee: General Motors Corporation, Detroit, Mich.

[22] Filed: Sept. 25, 1972

[21] Appl. No.: 291,584

[52] U.S. Cl. .......................................... 136/120 FC
[51] Int. Cl. ........................................... H01m 13/00
[58] Field of Search........ 136/120 FC, 120 R, 86 D, 136/28, 29, 20; 252/432; 423/276

[56] References Cited
UNITED STATES PATENTS

| | | | |
|---|---|---|---|
| 3,183,123 | 5/1965 | Haworth | 136/120 FC X |
| 3,470,030 | 9/1969 | Lindholm et al. | 136/120 FC |
| 3,513,028 | 5/1970 | Salomon | 136/120 FC X |

*Primary Examiner*—Anthony Skapars
*Attorney, Agent, or Firm*—Lawrence B. Plant

[57] ABSTRACT

This invention relates to fuel cell electrodes employing nickel boride as a catalyst and used with aqueous potassium hydroxide electrolytes. More particularly, this invention relates to mildly heat-treating the nickel boride in the presence of oxygen to retard degradation of its effectiveness upon continued exposure to aqueous potassium hydroxide and to thereby extend the life of electrodes made therefrom.

3 Claims, 2 Drawing Figures

3,852,116

STABILIZATION OF NICKEL BORIDE CATALYST IN POTASSIUM HYDROXIDE ELECTROLYTES

BACKGROUND OF THE INVENTION

Nickel boride has been proposed as a catalyst for a number of fuel cell reactions carried out in aqueous potassium hydroxide electrolytes. In this regard, the nickel boride catalyst is useful at an anode to promote the oxidation of a number of fuels including hydrogen, hydrazine, hydrazine derivatives (e.g., monomethylhydrazine) etc. Nickel boride has also been suggested as being useful at cathodes used with air or oxygen. The nickel boride can be formed, compacted, and sintered into a self-supporting electrode or as is usually the case, it is supported on a separate electrically conductive member made from a high surface area, low resistivity material which is inert to the potassium hydroxide electrolyte. The precise shape or structure of the support varies according to the nature of the reactant used with it. In this regard, gaseous (e.g., hydrogen or oxygen) reactants have different structural requirements than liquid reactants. Examples of gas electrode supports includes reticulated metal foam, wire meshes, felts of sintered metal fibers, porous carbon, and sintered carbon-Teflon as are known to those skilled in the art. The sintered carbon-Teflon type are described in more detail in United States patent application Ser. No. 86,058, filed Nov. 2, 1970, in the name of Romeo R. Witherspoon, entitled "Hydrophilic Treatment of Fuel Cell Electrodes" and assigned to the assignee of the present invention. An example of an electrode support useful with a liquid fuel (i.e., hydrazine) is an impervious metal foil having a plurality of nickel boride anchorage sites firmly bonded to its surface. One such electrode has electrolytic nickel bonded carbonyl nickel particles as the anchorage sites and is described in United States patent application Ser. No. 272,309, filed July 17, 1972, in the name of Stuart Meibuhr et al., entitled "Method of Making Anodes for Hydrazine Fuel Cells" and assigned to the assignee of the present invention. The appropriate portions of the aforesaid patent applications are intended to be herein incorporated by reference.

Nickel boride has been applied to the supports in a number of ways including wetting the support with a solution of a nickel salt and subsequently immersing the wetted support in a solution of an alkali metal borohydride to chemically form the nickel boride in situ on the support. Another technique comprises spreading a pre-formed nickel boride paste onto/into the support by troweling or the like.

THE PROBLEM

Nickel boride catalyzed electrodes in continuous contact with aqueous potassium hydroxide solutions are usually short lived. In this regard, electrodes made therefrom polarize with time until finally the available potential from the electrode falls below a practicable value. More specifically, it has been observed that boron leaches out of the catalyst and into the electrolyte at about the same rate as the performance of the electrode decays. This degradation of the catalyst is manifested by an increase in the iR-free polarization of the electrode as measured against a standard Hg/HgO reference electrode using a modified Kordesch-Marko interrupter to correct for solution iR-drop. Boron concentration in the electrolyte is determined by chemical analysis. Boron loss to the electrolyte is directly proportional to contact time therebetween and is apparently independent of anodic current density. The boron loss rate to 33% KOH electrolytes, for example, was measured at about 0.018 micrograms per hour.

BRIEF DESCRIPTION OF THE INVENTION

It is therefore an object of the present invention to stablilize the nickel boride to the extent of substantially reducing its degradation rate and thereby reduce the rate at which electrode performance decays. This and other objects of this invention will become more apparent from the detailed description which follows.

This invention comprehends stabilizing nickel boride catalyst to be used for catalyzing electrochemical reactions in the presence of aqueous potassium hydroxide electrolytes. More particularly, this invention involves heating the nickel boride for at least about three quarters (¾) of an hour but less than about 2 hours at a temperature between about 70°C. to 110°C. in the presence of oxygen. This treatment is more conveniently carried out after the nickel boride has been deposited on the support. However, some supports sinter at low temperatures and for such supports it may be desirable to treat the nickel boride before it is applied to the support.

DISCUSSION AND PREFERRED EMBODIMENTS:

In a preferred form of the invention, the nickel boride is heated to about 93°C. for about one hour in a stream of dry air flowing across it. The precise mechanism whereby electrode life is improved is not understood, but scanning electron microscope studies have shown that samples heated in a vacuum were not modified in the same manner as those heat treated in the presence of oxygen. In this regard, the mere application of heat does not appear to sinter or in anyway change the surface structure of the nickel boride hence suggesting that the improved life and performance of the oxygen heat-treated catalyst is somehow related to surface oxide formation or possibly loss of boron from the lattice of the catalyst. Regardless of the precise mechanism, the oxygen heat-treatment of the present invention appears to retard the leaching-out of the boron from the catalyst.

Observations were made using hydrazine anodes catalyzed with nickel boride but not heat-treated. These anodes exhibited a time decay in performance as measured by the iR-free potential against a Hg/HgO reference electrode. Examination of the electrode surface taken before and after the electrochemical tests as well as periodic chemical analysis of the electrolyte used in the test showed that there was a loss of material from the anode and a corresponding increase in the concentration of boron in the potassium hydroxide. The rate of loss from the electrode substantially coincided with the rate of decay of the anode potential. The rate of decay of the electrode's potential was substantially reduced by subjecting the anode to the aforesaid mild heat treatment. In this regard, an arbitrary cut-off potential of −0.95V was used to life-test the electrodes. Hydrazine anodes treated according to this invention had operating lives such that their reference potentials were more negative than −0.95 volts for periods averaging about two and one half times (2½ X) longer than untreated anodes. These results remained substantially unchanged for anodes heat-treated with both moist and dry air. More specifically, a number of tests were conducted using a nickel boride catalyzed hydrazine anode of the type disclosed in the aforesaid United States patent application, Ser. No. 272,309. Some were untreated and used as controls while others were modified by the heat treatment of this invention. Generally speaking, when operating at a current density of 200 milliamperes per square centimeter (ma/cm$^2$), electrodes not heat treated in accordance with this invention decayed to the cutoff voltage of —0.95 volts in about 60 hours of electrochemical operating time and 220 hours of KOH contact time. Occassionally, some of these electrodes lasted as much as 80 hours of operating time and 300 hours of contact time. In contrast to this, the oxygen (air) heat-treated anodes sustained about 160 hours of electrochemical activity and 600 hours of KOH contact time.

To illustrate the invention, dimpled nickel foils (0.05 mm thick) were electroformed as a chromium-plated, stainless steel mandrel from an 18 liter nickel sulfamate and nickel chloride bath comprising 300 grams per liter nickel sulfamate, 6 grams per liter nickel chloride and 30 grams per liter boric acid (pH 2.3 – 4.0). The geometric area of the dimpled foil was about 48 cm$^2$ though due to the dimples the actual surface was larger. Carbonyl nickel particles (International Nickel Co.) were then electrolytically co-deposited with electrolytic nickel onto the electroformed foils using a vertical half-box arrangement with the foils at the bottom and using 500 ml of the aforesaid nickel sulfamate electroforming solution and 500 milligrams of carbonyl nickel. A nickel anode screen was spaced above the foil to provide an electrode gap of about 62 mm. A potential was established between the foil and the screen and the nickel bath poured into the cell. A stirrer was energized (i.e., 7100 rpm) and the carbonyl nickel (International Nickel Mond 255) added. Stirring continued for 1 minute and then stopped. Plating continued for about 9 minutes after stirring stopped for a total of about 10 minutes total plating time at a current density of about 0.04 amps/cm$^2$ of the support's geometrical area. In general, an acceptable plating range for the electrolytic deposition of the electrolytic and carbonyl nickel is about 5 to 24 total coulombs per square centimeter of support.

Nickel boride catalyst was chemically formed in and on the carbonyl nickel by first dipping the support into a 5 percent aqueous solution of nickel acetate for about 15 seconds, draining and then dipping it into an aqueous 10 percent solution of sodium borohydride for about 30 seconds and rinsing. This procedure was repeated three times or until about 3 mg/cm$^2$ of nickel boride was formed. After drying, the anodes were placed in a pre-heated tube furnace modified to operate over the desired temperature range and to accept flowing air. The air flow was 1½ liters per minute which was begun immediately and continued for the duration of the heat treatment. The heat treatment itself lasted 1 hour at a temperature of 93°C. The still warm anodes were removed from the furnace and placed immediately into the test cells. Other test anodes were similarly heat-treated but in a vacuum (10$^{-3}$mm Hg) and allowed to cool in the vacuum before assembly into test cells.

The test anodes were operated at a constant current density of 200 milliamperes per square centimeter (ma/cm$^2$) for about 2 hours before the initial iR-free polarization data were taken. The test temperature was about 31°C. using about 300 cc of a 33% KOH electrolyte containing 3.2% hydrazine as the anolyte and flowing it over the anode at a rate of about 100 ml/min. At this flow rate, the fuel concentration was about 16 times the stoichiometric amount. The catholyte was 33% KOH and perforated stainless steel was used as the counter electrode at which hydrogen was evolved during testing. The anolyte and catholyte were separated by a microporous membrane material known as Acropor AN 200 (acrylonitrile polyvinylchloride reinforced with nylon) sold by the Gelman Instrument Company. Polarization data were made daily and the anode was operated at 200 ma/cm$^2$ between polarization runs.

Boron concentrations were measured at the conclusion of several electrochemical tests. The tests were terminated when the iR-free anode-reference potential (Hg/HgO) fell to —0.95V. A modified Kordesch-Marko interrupter was used to correct for electrolyte iR-drop. The anodes were capable of operating for longer times at potential values below —0.95V, but this value was selected as the "cutoff" potential for evaluation purposes.

Nickel boride anodes which were not heat-treated exhibited a time dependence in the anode potential as depicted in FIG. 1. The time scale represents only the number of hours of electrochemical usage of the anode at 200 milliamperes per square centimeter. However, the anode remained in contact with the KOH electrolyte at open circuit potential overnight and weekends; the total KOH contact time was about four times longer than the electrochemical usage time. The anode reference potential decayed to the arbitrary cutoff voltage of —0.95 volts within 40 to 80 hours of electrochemical usage. On the average, these anodes could be expected to perform at potentials above —0.95 volts for times of about 60 hours of electrochemical usage and a KOH contact time of about 220 hours.

Figure 2:
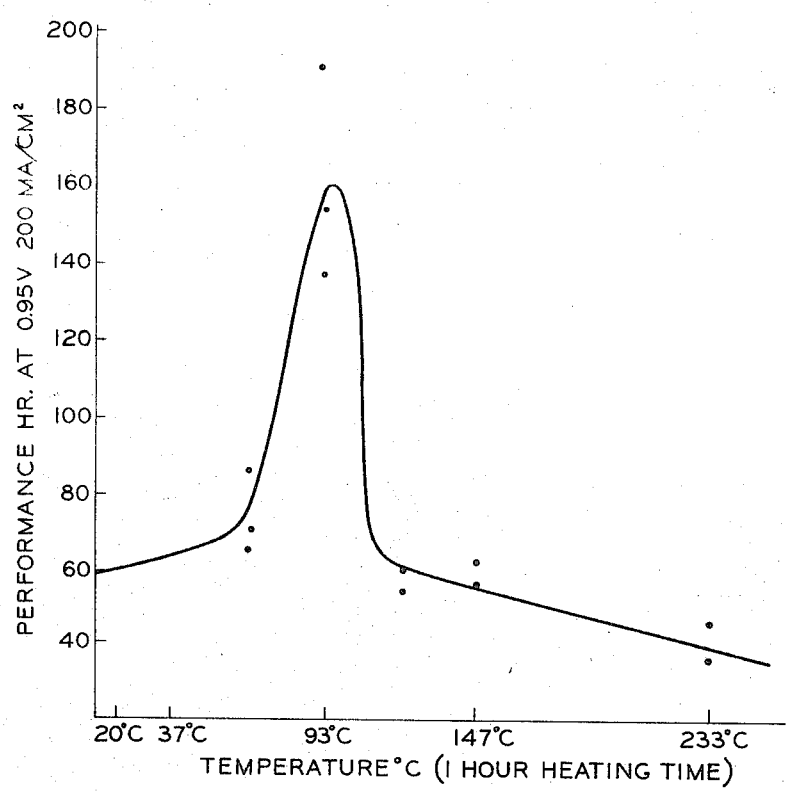

In contrast, test results on nickel boride anodes heat treated in dry air as described above showed that the operating life of the anodes was significantly greater than those not so treated. For a 1 hour oxygen heat treatment, the effect of different heat treating temperatures up to and including 233°C. on the operating life of the electrodes is shown in FIG. 2. Despite some scatter in the data, it is clear that the optimum temperature for heat treating the nickel boride is about 93°C. Chemical analysis of the KOH electrolytes in contact with anodes heat treated in a narrow range showed that the heat treated anodes lose boron less rapidly than the non-heat treated anodes. More particularly, the rate of boron loss for anodes treated at 93°C. for 1 hour was only 25% of that for non-heat treated anodes. On the other hand, the performance of anodes treated at a much lower (i.e., 65°C.) and much higher temperatures (i.e., about 120°C.) was about the same as for the untreated anodes. Scanning electron microscope evaluation of a number of samples treated at different temperatures shows the effect of temperature on the surface structure of the nickel boride. Analysis of these micrographs show that nickel boride loses material when it is heated in air, a phenomenon which does not appear to occur when the anodes are heated in a vacuum. At heat-treating temperatures above the range of this invention and above about 120°C. considerably more material is lost from the anodes than is lost at the preferred 93°C. temperature. At these higher temperatures, the loss of materials from the electrode is excessive resulting in poor electrochemical performance as compared to the results obtained from electrodes heat treated in the preferred range of this invention (see FIG. 2).

To determine the effect of heating time, identically prepared nickel boride anodes were heat treated at 93°C. in flowing air for four different times. At the 200 ma/cm$^2$ rate, the control sample, which was not heat treated, operated for 26 hours of electrochemical usage and 74 hours of KOH contact to the cutoff voltage of −0.95 volts. The sample heat treated for one-half hour operated for 43 hours of electrochemical usage and 175 hours of KOH contact time to the cutoff voltage of −0.95 volts. The sample heat treated for one hour operated for 160 hours of electrochemical usage and 600 hours of KOH contact time to the cutoff voltage of −0.95 volts. The sample treated for 4 hours operated for 50 hours of electrochemical usage and 197 hours of KOH contact time to the cutoff voltage of −0.95 volts. The sample heated for 16 hours operated for only 12 hours of electrochemical usage and 28 hours of KOH contact time to a cutoff voltage of −0.95 volts. Hence, it is seen that heat treating the anodes between about ½ hour to about 4 hours approximately doubles the useful life of the anodes as compared to anodes which are not heat treated or are heat treated for periods less than ½ hour or in excess of about 4 hours. Scanning electron microscope observation of a nickel boride surface heat treated for 2 hours showed that some discontinuities had formed in the surface. A most preferred range then commences between ½ hour and 1 hour and ends somewhere less than about 2 hours.

The anodes which were heat treated in vacuum had an inexplicable divergent electrochemical performance. The iR-free potential of one sample, for example, has an initial potential of only −0.975V and fell below the cutoff voltage (−0.95V) in about 40 hours of electrochemical usage and 100 hours of KOH contact time. The iR-free potential of another anode remained near −1.0 volts for 95 hours electrochemical usage and 350 hours of KOH contact time and fell to the cutoff voltage of −0.95V in 118 hours electrochemical usage and 670 hours KOH contact time.

While we have disclosed our invention primarily in terms of specific embodiments thereof, we do not intend to be limited thereto except to the extent hereinafter set forth in the claims which follow.

We claim:

1. In the method of making fuel cell electrodes for use in an aqueous potassium hydroxide electrolyte including the principal step of depositing fine particles of nickel boride catalyst on an electrically conductive support, the improvement comprising heating said catalyst in the presence of oxygen to a temperature of about 70°C. to about 110°C. for a period of at least about three-quarters of an hour to less than about two hours to retard the rate of decay of the electrode on continued contact with the electrolyte.

2. In the method of making hydrazine anodes for use in an aqueous potassium hydroxide electrolyte fuel cell including the principal step of depositing fine particles of nickel boride catalyst on an electrically conductive support, the improvement comprising heating said catalyst for about 1 hour to a temperature of about 93°C. in the presence of air flowing in contact with the catalyst to retard the rate of decay of the electrode on continued contact with the electrolyte.

3. In the method of making a fuel electrode for use in a hydrazine-fueled fuel cell including the steps of making an electrically conductive support the cathode in a nickel electroplating cell, filling the cell with a nickel plating bath containing suspended particles of carbonyl nickel, passing at least about 5 coulombs per square centimeter of support and less than 24 coulombs per square centimeter of support through said cell to electrolyze said bath and plate electrolytic nickel onto the support while codepositing the particles onto the support along with the electrolytic nickel, contacting the support and wetting the nickel-bound particles thereon with a solution of a soluble nickel salt and solvent therefor, and contacting said wetted nickel-bound particles with a solution of an alkali metal borohydride and solvent therefor to form nickel boride in situ on the nickel-bound carbonyl nickel particles, the improvement comprising heating the thusly catalyzed support in the presence of oxygen to a temperature of about 70°C. to about 110°C. for a period of about ¾ of an hour to less than about 2 hours to retard the rate of decay of the electrode on continued contact with the potassium hydroxide electrolyte.

* * * * *